(12) United States Patent
Ke

(10) Patent No.: US 12,457,211 B2
(45) Date of Patent: Oct. 28, 2025

(54) ACCESS CONTROL METHOD, ACCESS CONTROL APPARATUS, AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 207 days.

(21) Appl. No.: 18/104,061

(22) Filed: Jan. 31, 2023

(65) Prior Publication Data

US 2023/0179597 A1 Jun. 8, 2023

Related U.S. Application Data

(63) Continuation of application No. PCT/CN2021/110015, filed on Aug. 2, 2021.

(30) Foreign Application Priority Data

Jul. 31, 2020 (CN) .......................... 202010762196.3
Apr. 6, 2021 (CN) .......................... 202110369540.7

(51) Int. Cl.
*G06F 15/16* (2006.01)
*G06F 9/54* (2006.01)
(Continued)

(52) U.S. Cl.
CPC ........ *H04L 63/0876* (2013.01); *H04L 63/083* (2013.01); *H04L 63/105* (2013.01)

(58) Field of Classification Search
CPC . H04L 63/0876; H04L 63/083; H04L 63/105; H04L 63/0884
(Continued)

(56) References Cited

U.S. PATENT DOCUMENTS 7,840,708 B2 * 11/2010 Smith .................. H04L 63/083
726/28
8,305,596 B2 * 11/2012 Hamada .............. G06F 21/6218
358/1.14
(Continued)

FOREIGN PATENT DOCUMENTS

CN 107211272 A 9/2017
CN 109413646 A 3/2019
(Continued)

OTHER PUBLICATIONS

International Search Report and Written Opinion for Application No. PCT/CN2021/110015, dated Nov. 1, 2021, 9 Pages.
(Continued)

*Primary Examiner* — Hamza N Algibhah
(74) *Attorney, Agent, or Firm* — BROOKS KUSHMAN P.C.

(57) ABSTRACT

An access control method, an access control apparatus, and a communications device. The access control method includes: obtaining first information and/or second information, where the first information includes at least one of the following: indication information of a first access mode, a first-type routing indication, and a first-type network identifier, and the second information includes at least one of the following: the first-type network identifier, the first-type routing indication, a first-type group identifier, and identification information of a terminal; and performing a first operation based on the first information and/or the second information; where the first operation includes at least one of the following: selecting a first authentication service network element; and determining the first-type group identifier, determining the first-type routing indication, or determining the first-type network identifier.

20 Claims, 7 Drawing Sheets

(51) Int. Cl.
*H04L 9/40* (2022.01)
*H04L 29/06* (2006.01)

(58) Field of Classification Search
USPC .............................................................. 726/4
See application file for complete search history.

(56) References Cited

U.S. PATENT DOCUMENTS

| | | | | |
|---|---|---|---|---|
| 8,755,389 | B1* | 6/2014 | Poutievski | H04L 45/245 370/395.31 |
| 9,118,578 | B2* | 8/2015 | Olshansky | H04L 47/828 |
| 9,282,098 | B1* | 3/2016 | Hitchcock | H04L 63/0281 |
| 10,136,318 | B1* | 11/2018 | Hancock | H04L 63/0876 |
| 10,263,911 | B2* | 4/2019 | Xiang | H04L 47/781 |
| 10,701,139 | B2* | 6/2020 | Li | H04L 41/0893 |
| 11,122,033 | B2* | 9/2021 | Chen | H04L 63/18 |
| 11,397,605 | B2* | 7/2022 | Miyakoshi | H04L 43/0876 |
| 2002/0078383 | A1* | 6/2002 | Leerssen | H04L 63/104 726/13 |
| 2006/0031407 | A1* | 2/2006 | Dispensa | H04L 61/25 709/219 |
| 2006/0156385 | A1* | 7/2006 | Chiviendacz | H04L 9/3271 726/2 |
| 2011/0197267 | A1* | 8/2011 | Gravel | H04L 9/3226 726/5 |
| 2013/0139222 | A1* | 5/2013 | Kirillin | H04L 67/02 726/4 |
| 2013/0198824 | A1* | 8/2013 | Hitchcock | H04L 63/102 726/5 |
| 2013/0312073 | A1* | 11/2013 | Srivastav | H04L 9/3215 726/7 |
| 2014/0273958 | A1 | 9/2014 | Messana et al. | |
| 2014/0298421 | A1* | 10/2014 | Johnson | H04L 63/0853 726/4 |
| 2015/0043561 | A1 | 2/2015 | Xia | |
| 2016/0105332 | A1* | 4/2016 | Xiang | H04L 67/10 709/226 |
| 2016/0112452 | A1* | 4/2016 | Guevin | H04L 63/10 726/1 |
| 2016/0212017 | A1* | 7/2016 | Li | H04L 41/5048 |
| 2016/0381150 | A1* | 12/2016 | Rajagopal | H04L 41/40 709/223 |
| 2017/0288971 | A1* | 10/2017 | Jayaraman | H04L 41/5051 |
| 2017/0339626 | A1 | 11/2017 | Mustajarvi et al. | |
| 2018/0004563 | A1* | 1/2018 | Miyazaki | G06F 9/5077 |
| 2018/0011730 | A1* | 1/2018 | Zembutsu | H04L 41/0836 |
| 2018/0063334 | A1* | 3/2018 | Nanjundan | H04L 12/14 |
| 2018/0146031 | A1* | 5/2018 | Li | H04L 41/5009 |
| 2018/0181424 | A1* | 6/2018 | Gokurakuji | G06F 9/5077 |
| 2018/0375766 | A1* | 12/2018 | Filsfils | H04L 45/14 |
| 2019/0058670 | A1* | 2/2019 | Zhu | H04L 12/6418 |
| 2019/0089588 | A1* | 3/2019 | Xu | H04L 49/253 |
| 2019/0089780 | A1* | 3/2019 | Yousaf | G06F 9/45533 |
| 2019/0104182 | A1* | 4/2019 | Elzur | H04L 67/125 |
| 2019/0363924 | A1* | 11/2019 | Tse | G06F 9/5077 |
| 2020/0162856 | A1* | 5/2020 | Ziv | H04W 4/08 |
| 2020/0186526 | A1 | 6/2020 | Li | |
| 2020/0329008 | A1* | 10/2020 | Dao | H04L 61/5007 |
| 2020/0404069 | A1* | 12/2020 | Li | H04L 67/59 |
| 2021/0112412 | A1 | 4/2021 | Ke | |
| 2021/0160175 | A1* | 5/2021 | Gupta | H04L 45/745 |
| 2021/0409933 | A1* | 12/2021 | Jing | H04W 60/00 |
| 2022/0039003 | A1* | 2/2022 | Castellanos Zamora | H04W 8/20 |
| 2022/0060325 | A1* | 2/2022 | Castellanos Zamora | H04W 12/40 |
| 2022/0158910 | A1* | 5/2022 | Santos | H04L 41/5009 |
| 2022/0225168 | A1* | 7/2022 | Kim | H04W 4/44 |
| 2022/0225170 | A1* | 7/2022 | Xia | H04L 41/0895 |
| 2022/0312311 | A1* | 9/2022 | Vangala | H04W 48/20 |
| 2022/0329495 | A1* | 10/2022 | Xie | H04L 41/40 |
| 2022/0345934 | A1* | 10/2022 | Kim | H04W 4/40 |
| 2022/0361045 | A1* | 11/2022 | Takeda | H04W 64/00 |
| 2022/0394580 | A1* | 12/2022 | Minokuchi | H04W 36/023 |
| 2023/0113108 | A1* | 4/2023 | Tao | H04W 12/06 455/418 |
| 2023/0148302 | A1* | 5/2023 | Ping | H04W 24/02 370/254 |
| 2023/0164538 | A1* | 5/2023 | Zhu | H04W 8/18 455/414.1 |
| 2023/0189190 | A1* | 6/2023 | Ding | H04L 5/0048 455/415 |
| 2023/0217362 | A1* | 7/2023 | Sharma | H04W 24/02 370/329 |
| 2023/0261950 | A1* | 8/2023 | Xie | H04L 41/342 709/222 |
| 2023/0262453 | A1* | 8/2023 | Baskaran | H04W 63/1 726/1 |
| 2023/0262463 | A1* | 8/2023 | Kunz | H04L 63/1475 455/410 |
| 2023/0362637 | A1* | 11/2023 | Thiebaut | H04W 12/63 |

FOREIGN PATENT DOCUMENTS

| | | |
|---|---|---|
| CN | 110636506 A | 12/2019 |
| EP | 3358887 A1 | 8/2018 |
| WO | 2013159576 A1 | 10/2013 |
| WO | 2019035287 A1 | 2/2019 |
| WO | 2020098974 A1 | 5/2020 |

OTHER PUBLICATIONS

Huawei, HiSilicon "Alternative 3GPP Credentials based on Identity-based Cryptography" 3GPP TSG SA WG3 (Security) Meeting #84b, San Diego (USA), Jul. 2016, S3-161365, 5 Pages.

First Office Action for Chinese Application No. 202110369540.7, dated Dec. 28, 2023, 17 Pages.

Extended European Search Report for Application No. 21851111.1, dated Dec. 14, 2023, 13 Pages.

3GPP 3rd Generation Partnership Project; Technical Specification Group Services and System Aspects; Study on enhanced support of non-public networks (Release 17) 3GPP TR 23.700-07 V0.4.0, 2020, 159 Pages.

Ericsson "AUSF/UDM selection using SUCI" 3GPP SA WG2 Meeting #1278IS, Newport Beach, CA, USA, May 2018, S2-184772, 3 Pages.

Motorola Mobility, "KI #1, New Sol: UE external subscription data stored in the SNPN" 3GPP TSG-SA WG2 Meeting #139E {e-meeting}, Elbonia, Jun. 2020, S2-2004212, 6 Pages.

First Office Action for Japanese Application No. 2023-503412, dated Dec. 11, 2023, 4 Pages.

Ericsson "NF selection in SNPN 5GC" 3GPP TSG-SA WG2 Meeting #138E, Elbonia, Apr. 2020, S2-2003250, 3 Pages.

Samsung "KI#4, Solution #5: update on UE onboarding and remote provisioning UP solution" 3GPP TSG-WG SA2 Meeting #139e-meeting, Elbonia, Jun. 2020, S2-2004368, 8 Pages.

Samsung, "KI#4, new Solution: UE onboarding via control plane" 3GPP TSG-WG SA2 Meeting #139e-meeting, Elbonia, Jun. 2020, S2-2004369, 7 Pages.

* cited by examiner

ACCESS CONTROL METHOD, ACCESS CONTROL APPARATUS, AND COMMUNICATIONS DEVICE

CROSS-REFERENCE TO RELATED APPLICATIONS

This application is a continuation of International Application No. PCT/CN2021/110015 filed on Aug. 2, 2021, which claims priority to Chinese Patent Application No. 202010762196.3, filed on Jul. 31, 2020, and Chinese Patent Application No. 202110369540.7, filed on Apr. 6, 2021, which are incorporated herein by reference in their entireties.

TECHNICAL FIELD

Embodiments of this application relate to the field of communications technologies, and in particular, to an access control method, an access control apparatus, and a communications device.

BACKGROUND

At present, in a process of accessing another network (such manner may be referred to as onboarding) to download a credential for accessing a standalone non-public network (SNPN), a terminal needs to pass authentication of a default credential server. However, at that time, an authentication server function (AUSF) of the another network may be neither related to the terminal nor related to a subscription permanent identifier of the terminal. In this case, how to select an authentication service network element is a problem to be urgently resolved.

SUMMARY

Embodiments of this application provide an access control method, an access control apparatus, and a communications device, so as to resolve a problem of how to select an authentication service network element.

In order to resolve the foregoing technical problem, this application is implemented as follows:

According to a first aspect, an embodiment of this application provides an access control method, applied to a first communications device and including:
  obtaining first information and/or second information, where the first information includes at least one of the following: indication information of a first access mode, a first-type routing indication, and a first-type network identifier, and the second information includes at least one of the following: the first-type network identifier, the first-type routing indication, a first-type group identifier, and identification information of a terminal; and
  performing a first operation based on the first information and/or the second information.
The first operation includes at least one of the following: selecting a first authentication service network element; determining the first-type group identifier, the first-type routing indication, information about a service provider, and/or the first-type network identifier; and requesting, based on the first-type group identifier, the first-type routing indication, the first-type network identifier, the information about the service provider, and/or the indication information of the first access mode, to discover an authentication service network element.

The indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

The first network and the second network are a same network or different networks.

The first authentication service network element includes at least one of the following: an authentication service network element that provides an authentication service for a terminal being in the first access mode, and an authentication service network element that provides an authentication service for a terminal having a default credential.

The first-type group identifier includes: a group identifier of the authentication service network element that provides an authentication service for a terminal being in the first access mode;
  the first-type network identifier includes: a network identifier used in the first access mode;
  the first-type routing indication includes: a routing indication used in the first access mode;
  the identification information of the terminal includes at least one of the following: a first identifier of the terminal, a second identifier of the terminal, and a third identifier of the terminal;
  the first identifier of the terminal includes information about an authentication provider of the terminal;
  the second identifier of the terminal includes the first-type network identifier and/or the first-type routing indication; and
  the third identifier of the terminal includes the information about the authentication provider of the terminal, the first-type network identifier, and/or the first-type routing indication.

According to a second aspect, an embodiment of this application provides an access control method, applied to a second communications device and including:
  sending first information; where
  the first information includes at least one of the following: indication information of a first access mode, a first-type routing indication, a first-type network identifier, and identification information of a terminal;
  the first-type routing indication includes: a routing indication used in the first access mode;
  the first-type network identifier includes: a network identifier used in the first access mode;
  the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;
  the first network and the second network are a same network or different networks;
  the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

According to a third aspect, an embodiment of this application provides an access control method, applied to a third communications device and including:

obtaining third information and/or fourth information, where the third information includes at least one of the following: a first-type group identifier, information about an authentication provider, a first-type routing indication, a first-type network identifier, and indication information of a first access mode; and the fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; and performing a third operation based on the third information and/or the fourth information.

The third operation includes at least one of the following:

discovering an authentication service network element matching the third information, where fourth information of the authentication service network element matches the third information; and sending the discovered authentication service network element.

An authentication service type supported by the authentication service network element includes supporting provision of an authentication service to a terminal having a default credential;

the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the first-type group identifier includes: a group identifier of the authentication service network element that provides an authentication service for a terminal being in the first access mode;

the first-type routing indication includes: a routing indication used in the first access mode; and the first-type network identifier includes: a network identifier used in the first access mode.

According to a fourth aspect, an embodiment of this application provides an access control method, applied to a fourth communications device and including:

sending fourth information; where the fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; where a routing indication supported by the authentication service network element is the first-type routing indication;

a network identifier of a network to which the authentication service network element belongs is the first-type network identifier;

an identifier of a group to which the authentication service network element belongs is the first-type group identifier;

an access mode supported by the authentication service network element includes the first access mode;

an authentication service type supported by the authentication service network element includes supporting provision of an authentication service to a terminal having a default credential;

the first access mode includes at least one of the following: an access mode for accessing a first network to download a credential for accessing a second network, an access mode for accessing the first network without a credential for accessing the first network, and an access mode for using only a restricted service;

the first-type group identifier includes: a group identifier of the authentication service network element that provides an authentication service for a terminal being in the first access mode; and the first-type network identifier includes: a network identifier used in the first access mode.

According to a fifth aspect, an embodiment of this application provides an access control apparatus, applied to a first communications device and including:

a first obtaining module, configured to obtain first information and/or second information, where the first information includes at least one of the following: indication information of a first access mode, a first-type routing indication, and a first-type network identifier, and the second information includes at least one of the following: the first-type network identifier, the first-type routing indication, a first-type group identifier, and identification information of a terminal; and a first execution module, configured to perform a first operation based on the first information and/or the second information.

The first operation includes at least one of the following: selecting a first authentication service network element; determining the first-type group identifier, the first-type routing indication, information about a service provider, and/or the first-type network identifier; and requesting, based on the first-type group identifier, the first-type routing indication, the first-type network identifier, the information about the service provider, and/or the indication information of the first access mode, to discover an authentication service network element; where the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the first authentication service network element includes at least one of the following: an authentication service network element that provides an authentication service for a terminal being in the first access mode, and an authentication service network element that provides an authentication service for a terminal having a default credential;

the first-type group identifier includes: a group identifier of the authentication service network element that provides an authentication service for a terminal being in the first access mode;

the first-type network identifier includes: a network identifier used in the first access mode;

the first-type routing indication includes: a routing indication used in the first access mode;

the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

According to a sixth aspect, an embodiment of this application provides an access control apparatus, applied to a second communications device and including:

a first sending module, configured to send first information; where the first information includes at least one of the following: indication information of a first access mode, a first-type routing indication, a first-type network identifier, and identification information of a terminal;

the first-type routing indication includes: a routing indication used in the first access mode;

the first-type network identifier includes: a network identifier used in the first access mode;

the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

According to a seventh aspect, an embodiment of this application provides an access control apparatus, applied to a third communications device and including:

a second obtaining module, configured to obtain third information and/or fourth information, where the third information includes at least one of the following: a first-type group identifier, a first-type routing indication, a first-type network identifier, information about an authentication provider, and indication information of a first access mode; and the fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; and a second execution module, configured to perform a third operation based on the third information and/or the fourth information.

The third operation includes at least one of the following:

discovering an authentication service network element matching the third information, where fourth information of the authentication service network element matches the third information; and sending the discovered authentication service network element; where an authentication service type supported by the authentication service network element includes supporting provision of an authentication service to a terminal having a default credential;

the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the first-type group identifier includes: a group identifier of the authentication service network element that provides an authentication service for a terminal being in the first access mode;

the first-type routing indication includes: a routing indication used in the first access mode; and the first-type network identifier includes: a network identifier used in the first access mode.

According to an eighth aspect, an embodiment of this application provides an access control apparatus, applied to a fourth communications device and including:

a second sending module, configured to send fourth information; where the fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; where a routing indication supported by the authentication service network element is the first-type routing indication;

a network identifier of a network to which the authentication service network element belongs is the first-type network identifier;

an identifier of a group to which the authentication service network element belongs is the first-type group identifier;

an access mode supported by the authentication service network element includes the first access mode;

an authentication service type supported by the authentication service network element includes supporting provision of an authentication service to a terminal having a default credential;

the first access mode includes at least one of the following: an access mode for accessing a first network to download a credential for accessing a second network, an access mode for accessing the first network without a credential for accessing the first network, and an access mode for using only a restricted service;

the first-type group identifier includes: a group identifier of the authentication service network element that provides an authentication service for a terminal being in the first access mode; and the first-type network identifier includes: a network identifier used in the first access mode.

According to a ninth aspect, an embodiment of this application provides an access control method, applied to a fifth communications device and including:

performing a fifth operation in a case that a fifth condition is satisfied.

The fifth operation includes at least one of the following: skipping using fifth information to select a network element for a terminal; where the fifth condition includes at least one of the following: the terminal is in the first access mode; and the fifth information includes at least one of the following: a user identifier of the terminal, an MNC in the user identifier of the terminal, an MCC in the user identifier of the terminal, information in realm in the user identifier of the terminal, a first network identifier NID in the user identifier of the terminal, and a network identifier in the user identifier of the terminal.

According to a tenth aspect, an embodiment of this application provides an access control apparatus, applied to a second communications device and including:

a third execution module, configured to perform a fifth operation in a case that a fifth condition is satisfied.

The fifth operation includes at least one of the following: skipping using fifth information to select a network element for a terminal; where the fifth condition includes at least one of the following: the terminal is in the first access mode; and the fifth information includes at least one of the following: a user identifier of the terminal, network identification information in the user identifier of the terminal, and information in realm in the user identifier of the terminal.

According to an eleventh aspect, an embodiment of this application provides a communications device, including a processor, a memory, and a computer program stored on the memory and capable of running on the processor. When the computer program is executed by the processor, the steps of the access control method according to the first aspect are implemented, or the steps of the access control method according to the second aspect are implemented, or the steps of the access control method according to the third aspect are implemented, or the steps of the access control method according to the fourth aspect are implemented, or the steps of the access control method according to the ninth aspect are implemented.

According to a twelfth aspect, an embodiment of this application provides a readable storage medium, where the readable storage medium stores a program or an instruction, and when the program or the instruction is executed by a processor, the steps of the access control method according to the first aspect are implemented, the steps of the access control method according to the second aspect are implemented, or the steps of the access control method according to the third aspect are implemented, or the steps of the access control method according to the fourth aspect are implemented, or the steps of the access control method according to the ninth aspect are implemented.

It is easy to understand that with the embodiments, selection of the authentication service network element can be supported in the foregoing scenario in which the terminal accesses the first network in the first access mode.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this application. Throughout the accompanying drawings, the same reference numerals represent the same components. In the accompanying drawings.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first", "second", and the like are intended to distinguish between similar objects but do not necessarily indicate a specific order or sequence. It should be understood that the numbers used in this way are interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

Figure 1A:
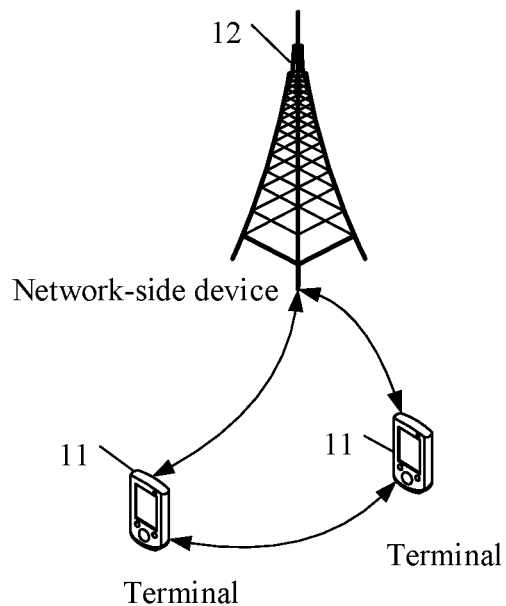
FIG. 1A is a schematic architectural diagram of a wireless communications system according to an embodiment of this application.

FIG. 1A is a block diagram of a wireless communications system to which the embodiments of this application are applicable. The wireless communications system includes a terminal 11 and a network-side device 12. The terminal 11 may include a relay supporting a terminal function and/or a terminal supporting a relay function. The terminal 11 may also be referred to as a terminal device or user equipment (UE), and the terminal 11 may be a terminal-side device, such as a mobile phone, a tablet computer (Tablet Personal Computer), a laptop computer (Laptop Computer) or a notebook computer, a personal digital assistant (PDA), a palmtop computer, a netbook, an ultra-mobile personal computer (UMPC), a mobile Internet device (MID), a wearable device (Wearable Device) or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in an NR system is merely used as an example, and a specific type of the base station is not limited.

In some communication scenarios, there are scenarios in which a communications device having no credential of a network still needs to access the network. For example, when a standalone non-public network (SNPN) is being deployed, the UE may still have no credential for accessing the SNPN or UE identifier, for example, an SNPN deployed in the factory and a terminal just purchased in the market, or an SNPN deployed at a concert site and terminals of the audience.

If such type of UE needs to obtain a credential for accessing an SNPN and a UE identifier, the UE may access a specific network (hereinafter referred to as a first network) and download the credential for accessing the SNPN. For example, the UE accesses the first network, establishes a data channel, connects to a configuration server through the data channel, and downloads an SNPN credential from the configuration server; or the UE accesses the first network, and a control network element of the first network downloads, for the UE, the SNPN credential from the configuration server.

A manner of accessing the first network to download a credential for accessing a second network may be referred to as onboarding. The first network and the second network may be a same network.

In a case that the UE does not have a credential of the first network, the first network needs to authenticate the UE before downloading the credential for the UE or establishing a data channel for downloading the credential. The UE may have a default credential; in this case, the first network may request a default credential server (DCS Default Credential Server) to authenticate the UE having the default credential. The DCS may directly authenticate the UE or request another entity to authenticate the UE.

Such type of authentication is analogous to authentication for roaming to access other networks by UE, but is different from authentication for roaming of the UE.

In a case of roaming, an access and mobility management function (AMF) of a network accessed by the UE selects, for the UE, a home authentication server function (home AUSF) of the network to which the UE belongs to, and requests the home AUSF to authenticate the UE.

Figure 1B:
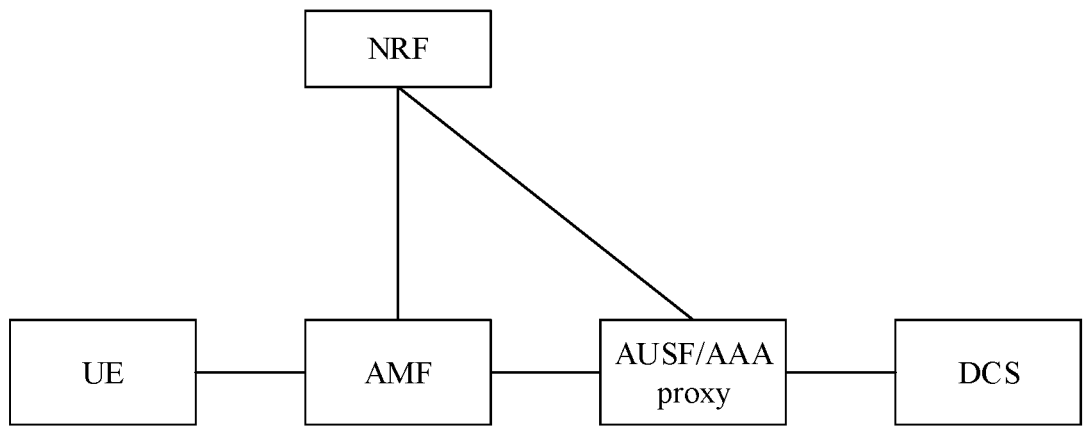
FIG. 1B is a schematic diagram of a relationship between network elements in a first access mode in this application.

In an onboarding manner, as shown in FIG. 1B, an AMF of the first network may select, for the UE, an authentication proxy server (for example, an authentication server function (AUSF) or an AAA (Authentication Authorization Accounting Server) serve proxy) of the first network accessed by the UE, and the authentication proxy server requests a default credential server (DC S) in another network to authenticate the UE. When the default credential that the UE has is a credential for a communications network (for example, a 3GPP network), the DCS may be a home AUSF of a home network of the UE. An NRF stores a relationship of network elements and may be called to query network elements.

UE having a public land mobile network (PLMN) credential is able to: (1) roam to access other PLMN networks using the PLMN credential, (2) access an SNPN using the PLMN credential, and (3) onboard the first network for authentication on a default credential. In the manner (1), an AMF of a network accessed by the UE communicates with an AUSF of a home network of the UE. In the manner (3), the AMF of the network accessed by the UE communicates with an authentication proxy server (for example, an AUSF or an AAA server proxy) of the accessed network, and the authentication proxy server communicates with a home AUSF of the UE. In the manner (2), an authentication structure in the manner (1) may be used or an authentication structure in the manner (3) may be used.

In order to support the authentication structure in the manner (3), the following problems still need to be resolved:

Problem 1: Currently during selection of an AUSF connected to the AMF, the AMF performs selection based on a home network identifier (Home Network Identifier) in a subscription permanent identifier (SUPI) provided by the UE or an AUSF group identifier (Group ID) associated with the SUPI. However, in an onboarding architecture, the AMF in the first network needs to select, for the UE, the AUSF in the first network, and the AUSF then selects, for the UE, a home AUSF of the UE. The AUSF of the first network is neither related to the UE nor related to the SUPI of the UE. How to select different AUSFs for UEs of different access types becomes a problem that needs to be resolved.

In the embodiments of this application, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this application. For example, when specific capability indication information transmitted by a device is not received, it can be deduced that the device does not support the capability.

Optionally, transmitting may include broadcasting, broadcasting through a system message, or returning a response upon reception of a request.

In an embodiment of this application, a non-public network is an abbreviation of non-public network. The non-public network may be referred to as one of the following: a non-public communications network. The non-public network may include at least one of the following deployment manners: a physical non-public network, a virtual non-public network, and a non-public network implemented on a public network. In an implementation, the non-public network is a closed access group (CAG). A CAG may include a group of terminals.

In an embodiment of this application, a non-public network service is an abbreviation of non-public network service. The non-public network service may also be referred to as one of the following: non-public-network network service, non-public communication service, non-public network communication service, non-public-network network service, or other names. It should be noted that the naming manner is not specifically limited in the embodiments of this application. In an implementation, the non-public network is a closed access group, and in this case, the non-public network service is a network service of the closed access group.

In an embodiment of this application, the non-public network may include or be referred to as a private network. The private network may be referred to as one of the following: a private communications network, a private network, a local area network (LAN), a private virtual network (PVN), an isolated communications network, a dedicated communications network, or other names. It should be noted that the naming manner is not specifically limited in the embodiments of this application.

In an embodiment of this application, a public network is an abbreviation of public network. The public network may be referred to as one of the following: a public communications network or other names. It should be noted that the naming manner is not specifically limited in the embodiments of this application.

In an optional embodiment of this application, an authentication service includes initiating an authentication request for the terminal to an authentication server (such as a DCS or a home AUSF). An authentication service network element may be an authentication proxy that provides an authentication service for the terminal. Optionally, the authentication service network element may include but is not limited to one of the following: an AUSF and an AAA proxy.

In an optional embodiment of this application, indication information of a first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

In an optional embodiment of this application, the credential for accessing the first network by the terminal being a default credential means that a credential corresponding to a terminal identifier and provided to the first network is a default credential when the terminal accesses the first network. In an implementation, the default credential is not a credential of the first network.

Optionally, the first network and the second network are a same network or different networks.

In an optional embodiment of this application, a network type of the first network may include but is not limited to one of the following: a public network (such as a PLMN), a standalone non-public network (such as an NPN), and a public network integrated non-public network (such as a PNI NPN).

In an optional embodiment of this application, having no credential for accessing the first network includes having no credential for accessing an unrestricted service of the first network.

(1) In an implementation, a terminal directly having a credential of a network B may be considered as the terminal having a credential for accessing the network B.

(2) In another implementation, an agreement (such as a roaming agreement) is present between a service provider A (including a network A) and the network B, and allows A's terminals to access the network B to use network services. In this case, it can be considered that A's terminals have a credential for accessing the network B, that is, a credential of A. Herein, accessing the network B by a terminal of the service provider A and a terminal in the network B may be considered to access an unrestricted service.

(3) In another implementation, in a manner in which a terminal of a service provider C (including a network C) accesses the network B to download a credential for accessing the network B, a credential of C that the terminal has can help the network B to request an authentication server in C to authenticate the terminal. In this case, the credential of C that the terminal has is not a credential for accessing the network B, but a credential for authenticating the terminal by the network B, which is generally referred to as a default credential. Herein, accessing the network B by the terminal of the service provider C may be considered as accessing a restricted service.

In an optional embodiment of this application, an authentication provider is a provider that can authenticate a terminal having a default credential. In an implementation, the authentication provider does not include a home network of the terminal in a roaming scenario.

In an optional embodiment of this application, information about the authentication provider of the terminal includes at least one of the following: a network identifier of a network corresponding to the default credential of the terminal, a network identifier in a terminal identifier corresponding to the default credential of the terminal, a network identifier of a home network of the terminal, index information of an authentication provider of the default credential, and index information of a DCS. It is easy to understand that the credential of the terminal corresponds to the identifier of the terminal, and the information about the authentication provider of the terminal may be included in the identifier of the terminal.

In an optional embodiment of this application, a first identifier of the terminal includes one of the following: a terminal identifier corresponding to the default credential of the terminal, or a terminal identifier of the terminal in the DCS.

In an implementation, an identifier of the home network of the terminal is a network identifier in the terminal identifier corresponding to the default credential of the terminal. In another implementation, an identifier of the home network of the terminal is a network identifier of the authentication provider.

Optionally, the DCS is a device of the authentication provider of the terminal. When the DCS includes a home AUSF of the terminal, the first identifier of the terminal is a terminal identifier of the terminal in the home network. In this case, the index information of the authentication provider of the default credential or the index information of the DCS is the identifier of the home network of the terminal.

In an optional embodiment of this application, the home network may be a network corresponding to the default credential of the terminal. In an implementation, the home AUSF is an AUSF in the home network. A home NRF is an NRF in the home network. Other home network elements are network elements in the home network.

In an optional embodiment of this application, a first-type network identifier includes a first-type home network identifier. The first-type home network identifier includes: a home network identifier used in the first access mode.

In another optional embodiment of this application, the first-type network identifier may be one of the following: a network identifier of the authentication provider, a network identifier corresponding to the default credential of the terminal, and a network identifier in the terminal identifier corresponding to the default credential of the terminal.

In an optional embodiment of this application, the communications device may include at least one of the following: a communications network element and a terminal.

In an embodiment of this application, the communications network element may include at least one of the following: a core-network network element and a radio-access-network network element.

In the embodiments of this application, a core-network network element (CN network element) may include but is not limited to at least one of the following: a core network device, a core network node, a core network function, a core-network network element, a mobility management entity (MME), an access mobility management function (AMF), a network repository function (NRF), a session management function (SMF), a user plane function (UPF), a serving gateway (SGW), a PDN gateway (PDN-GW), a policy control function (PCF), a policy and charging rules function (PCRF) unit, a GPRS serving support node (SGSN), a gateway GPRS support node (GGSN), a unified data management (UDM), a unified data repository (UDR), a home subscriber server (HSS), and an application function (AF).

The following describes the access control method in the embodiments of this application.

Figure 2:
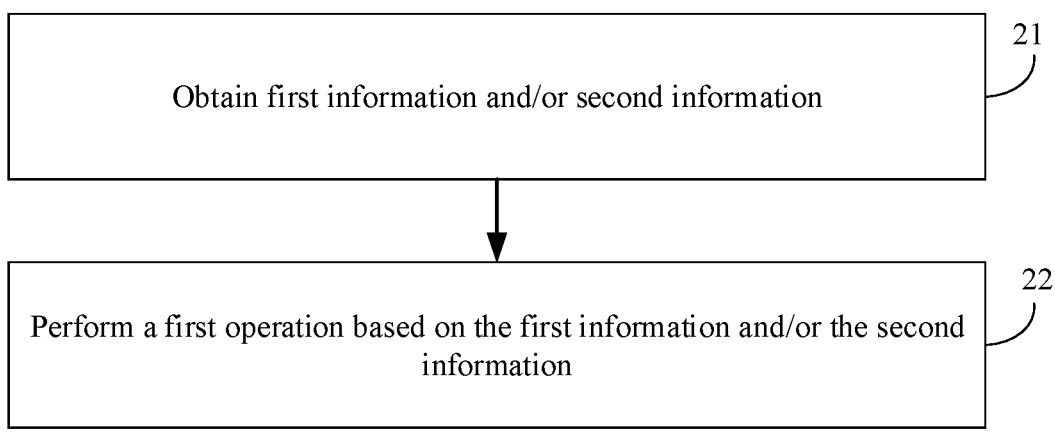
FIG. 2 is a schematic flowchart of an access control method according to an embodiment of this application.

Referring to FIG. 2, an embodiment of this application provides an access control method, applied to a first communications device. The first communications device includes an AMF. Optionally, the first communications device is a communications device in a first network. As shown in FIG. 2, the method includes the following steps.

Step 21: Obtain first information and/or second information.

The first information includes, but is not limited to, at least one of the following: indication information of a first access mode, a first-type routing indication, and a first-type network identifier. The second information includes, but is not limited to, at least one of the following: the first-type network identifier, the first-type routing indication, a first-type group identifier, and identification information of a terminal.

Optionally, the first-type group identifier includes: a group identifier of the authentication service network element that provides an authentication service for a terminal being in the first access mode.

Optionally, the first-type network identifier includes: a network identifier used in the first access mode.

Optionally, the first-type routing indication includes: a routing indication used in the first access mode.

In an implementation, the first information may be received and obtained from the terminal. The first information may be included in an identifier (such as a SUCI or SUPI) of the terminal for transmission.

In another implementation, the second information may be obtained through local configuration on the first communications device.

The identification information of the terminal may include at least one of the following: a first identifier of the terminal, a second identifier of the terminal, and a third identifier of the terminal.

(1) The first identifier of the terminal includes information about an authentication provider of the terminal. The authentication provider is a provider capable of authenticating a terminal having a default credential, or a provider capable of authenticating the terminal (for example, a home network of the terminal or a network corresponding to the default credential of the terminal). In an implementation, the authentication provider does not include a home network of the terminal in a roaming scenario.

The information about the authentication provider of the terminal includes at least one of the following: a network identifier of a network corresponding to the default credential of the terminal, a network identifier in a terminal identifier corresponding to the default credential of the terminal, a network identifier of a home network of the terminal, index information of an authentication provider of the default credential, and index information of a DCS. It is easy to understand that the credential of the terminal corresponds to the identifier of the terminal, and the information about the authentication provider of the terminal may be included in the identifier of the terminal.

The first identifier of the terminal includes one of the following: a terminal identifier corresponding to the default credential of the terminal, or a terminal identifier of the terminal in the DCS.

Optionally, the DCS is a device of the authentication provider of the terminal. When the DCS includes a home AUSF of the terminal, the first identifier of the terminal is a terminal identifier of the terminal in the home network. In this case, the index information of the authentication provider of the default credential or the index information of the DCS is an identifier of the home network of the terminal.

(2) The second identifier of the terminal includes the first-type network identifier and/or the first-type routing indication.

(3) The third identifier of the terminal includes the information about the authentication provider of the terminal, the first-type network identifier, and/or the first-type routing indication.

It is easy to understand that the first-type network identifier and/or the first-type routing indication may be determined based on the second identifier of the terminal or the third identifier of the terminal.

(1) In an implementation, the first identifier of the terminal and the first-type network identifier may be sent.

(2) In another implementation, the first identifier of the terminal and the first-type routing indication may be sent.

(3) In another implementation, the first identifier of the terminal and the second identifier of the terminal may be sent.

(4) In another implementation, the third identifier of the terminal may be sent.

Step 22: Perform a first operation based on the first information and/or the second information.

The first operation may include at least one of the following:
  selecting a first authentication service network element;
  determining the first-type group identifier, the first-type routing indication, information about a service provider, and/or the first-type network identifier; and
  requesting, based on the first-type group identifier, the first-type routing indication, the first-type network identifier, the information about the service provider, and/or the indication information of the first access mode, to discover an authentication service network element.

Optionally, the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

Optionally, the first network and the second network are a same network or different networks.

In an implementation, the indication information of the first access mode includes a first registration type. The first registration type may be used to indicate at least one of the following: a registration manner of performing registration to access the first network in order to download a credential for accessing the second network, and a registration manner of registering with the first network without a credential for accessing the first network.

Optionally, the credential for accessing the first network includes a credential for accessing an unrestricted service of the first network. Having no credential for accessing the first network includes having no credential for accessing an unrestricted service of the first network.

(1) In an implementation, a terminal directly having a credential of a network B may be considered as the terminal having a credential for accessing the network B.

(2) In another implementation, an agreement (such as a roaming agreement) is present between a service provider A (including a network A) and the network B, and allows A's terminals to access the network B to use network services. In this case, it can be considered that A's terminals have a credential for accessing the network B, that is, a credential of A. Herein, accessing the network B by a terminal of the service provider A and a terminal in the network B may be considered to access an unrestricted service.

(3) In another implementation, in a manner in which a terminal of a service provider C (including a network C) accesses the network B to download a credential for accessing the network B, a credential of C that the terminal has can help the network B to request an authentication server in C to authenticate the terminal. In this case, the credential of C that the terminal has is not a credential for accessing the network B, but a credential for authenticating the terminal by the network B, which is generally referred to as a default credential. Herein, accessing the network B by the terminal of the service provider C may be considered as accessing a restricted service.

Optionally, the first authentication service network element includes at least one of the following: an authentication service network element that provides an authentication service for a terminal being in the first access mode, and an authentication service network element that provides an authentication service for a terminal having a default credential.

In an implementation, the authentication service includes initiating an authentication request for the terminal to an authentication server (such as a DCS or a home AUSF).

In this embodiment of this application, the requesting, based on the first-type group identifier, the first-type routing indication, the first-type network identifier, or the indication information of the first access mode, to discover an authentication service network element may include at least one of the following:
  sending the first-type group identifier to a first target end, where the first-type group identifier is used by the first target end to discover an authentication service network element matching the first-type group identifier;
  sending the indication information of the first access mode to the first target end, where the indication information of the first access mode is used by the first target end to discover an authentication service network element matching the indication information of the first access mode;
  sending the first-type routing indication to the first target end, where the first-type routing indication is used by the first target end to discover an authentication service network element matching the first-type routing indication; and sending the first-type network identifier to the first target end, where the first-type network identifier is used by the first target end to discover an authentication service network element matching the first-type network identifier.

Optionally, the first target end may include: a network element device responsible for querying a network element in the network, for example, a network repository function (NRF).

Optionally, the authentication service network element may include but is not limited to one of the following: an AUSF and an AAA proxy. In an implementation, the authentication service network element may be an authentication proxy that provides an authentication service for the terminal.

In an implementation, an AUSF group identifier specially used for the first access mode may be used to request the NRF to discover an AUSF.

Optionally, the obtaining first information includes: obtaining the first information from the terminal; and/or the obtaining second information includes: obtaining the second information according to a configuration on the first communications device.

Optionally, the obtaining first information and/or second information may include at least one of the following:
  obtaining the indication information of the first access mode from the terminal; and
  obtaining the first-type group identifier, the first-type routing indication, or the first-type network identifier according to a configuration on the first communications device.

Further, the performing a first operation based on the first information and/or the second information may include:
  determining the first-type group identifier, the first-type routing indication, or the first-type network identifier based on the indication information of the first access mode; and
  requesting, based on the first-type group identifier, the first-type routing indication, and/or the first-type network identifier, to discover the authentication service network element.

Optionally, the obtaining first information and/or second information may include at least one of the following:
  obtaining the first-type network identifier and/or the first-type routing indication from the terminal; and
  obtaining the first-type group identifier according to a configuration on the first communications device.

Further, the performing a first operation based on the first information and/or the second information may include:
  determining the first-type group identifier based on the first-type network identifier and/or the first-type routing indication; and
  requesting, based on the first-type group identifier, to discover the authentication service network element.

Optionally, the first operation further includes at least one of the following:
  receiving an authentication service network element that is discovered as requested;
  exporting the first-type network identifier and/or the first-type routing indication based on the second identifier of the terminal or the third identifier of the terminal;
  skipping sending the second identifier of the terminal to the first authentication service network element or the discovered authentication service network element;
  exporting the first identifier of the terminal based on the third identifier of the terminal; and
  sending the first identifier of the terminal to the first authentication service network element or the discovered authentication service network element.

It is easy to understand that with the embodiments, selection of the authentication service network element can be supported in the foregoing scenario in which the terminal accesses the first network in the first access mode.

Figure 3:
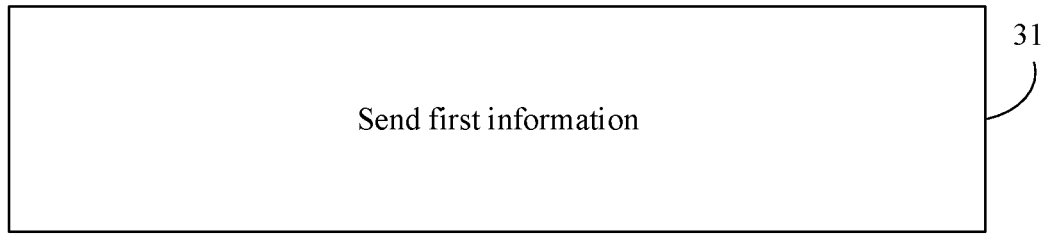
FIG. 3 is a schematic flowchart of an access control method according to another embodiment of this application.

Referring to FIG. 3, an embodiment of this application provides an access control method, applied to a second communications device. The second communications device includes UE. As shown in FIG. 3, the method includes the following step.

Step 31: Send first information.

The first information may include at least one of the following: indication information of a first access mode, a first-type routing indication, a first-type network identifier, and identification information of a terminal.

The first-type routing indication includes: a routing indication used in the first access mode.

The first-type network identifier includes: a network identifier used in the first access mode.

The indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

The first network and the second network are a same network or different networks.

Optionally, the first information is sent to the first network accessed by the terminal. A manner of accessing the first network by the terminal is the first access mode. The first information may be included in an identifier (such as a SUCI or SUPI) of the terminal for transmission.

Optionally, the sending first information may include: sending the first information in a case that a first condition is satisfied. The first condition includes at least one of the following:
  a purpose of accessing the first network by the second communications device is to download a credential for accessing the second network;
  the second communications device has no credential for accessing the first network; and
  the second communications device accessing the first network is merely allowed to use a restricted service.

The first network and the second network are a same network or different networks.

In an implementation, the network identifier used in the first access mode is sent by using a subscription permanent identifier SUPI of the terminal.

It should be noted that the second communications device having no credential for accessing the first network includes: the second communications device having no credential of the first network, or the second communications device having no credential of a service provider for accessing the first network.

The credential for accessing the first network may include a credential for accessing an unrestricted service of the first network. Having no credential for accessing the first network includes having no credential for accessing an unrestricted service of the first network.

(1) In an implementation, a terminal directly having a credential of a network B may be considered as the terminal having a credential for accessing the network B.

(2) In another implementation, an agreement (such as a roaming agreement) is present between a service provider A (including a network A) and the network B, and allows A's terminals to access the network B to use network services. In this case, it can be considered that A's terminals have a credential for accessing the network B, that is, a credential of A. Herein, accessing the network B by a terminal of the service provider A and a terminal in the network B may be considered to access an unrestricted service.

(3) In another implementation, in a manner in which a terminal of a service provider C (including a network C) accesses the network B to download a credential for accessing the network B, a credential of C that the terminal has can help the network B to request an authentication server in C to authenticate the terminal. In this case, the credential of C that the terminal has is not a credential for accessing the network B, but a credential for authenticating the terminal by the network B, which is generally referred to as a default credential. Herein, accessing the network B by the terminal of the service provider C may be considered as accessing a restricted service.

Optionally, the identification information of the terminal may include at least one of the following: a first identifier of the terminal, a second identifier of the terminal, and a third identifier of the terminal.

(1) The first identifier of the terminal includes information about an authentication provider of the terminal. The authentication provider is a provider capable of authenticating a terminal having a default credential, or a provider (for example, a home network of the terminal) capable of authenticating the terminal.

The information about the authentication provider of the terminal includes at least one of the following: a network identifier of a network corresponding to the default credential of the terminal, a network identifier in a terminal identifier corresponding to the default credential of the terminal, a network identifier of a home network of the terminal, index information of an authentication provider of the default credential, and index information of a DCS. The information about the authentication provider of the terminal may be included in the identifier of the terminal.

It is easy to understand that the credential of the terminal corresponds to the identifier of the terminal, and the first identifier of the terminal includes one of the following: a terminal identifier corresponding to the default credential of the terminal, or a terminal identifier of the terminal in the DCS.

Optionally, the DCS is a device of the authentication provider of the terminal. When the DCS includes a home AUSF of the terminal, the first identifier of the terminal is a terminal identifier of the terminal in the home network. In this case, the index information of the authentication provider of the default credential or the index information of the DCS is an identifier of the home network of the terminal.

(2) The second identifier of the terminal includes the first-type network identifier and/or the first-type routing indication.

(3) The third identifier of the terminal includes the information about the authentication provider of the terminal, the first-type network identifier, and/or the first-type routing indication.

It is easy to understand that the first-type network identifier and/or the first-type routing indication may be determined based on the second identifier of the terminal or the third identifier of the terminal.

(1) In an implementation, the first identifier of the terminal and the first-type network identifier may be sent.

(2) In another implementation, the first identifier of the terminal and the first-type routing indication may be sent.

(3) In another implementation, the first identifier of the terminal and the second identifier of the terminal may be sent.

(4) In another implementation, the third identifier of the terminal may be sent.

Optionally, before the step of sending first information, the method may further include at least one of the following:

generating the second identifier of the terminal, and setting a routing indication in an identifier of the terminal to the first-type routing indication and/or setting a home network identifier in the identifier of the terminal to the first-type network identifier; and generating a third identifier of the terminal, and adding the first-type network identifier to the identifier of the terminal and/or adding the first-type routing indication to the identifier of the terminal.

In an implementation, the operation of generating the second identifier of the terminal and/or generating the third identifier of the terminal is performed in a case that the first condition is satisfied. The first condition is as described above, and details are not repeated herein.

It is easy to understand that with the embodiments, selection of the authentication service network element can be supported in the foregoing scenario in which the terminal accesses the first network in the first access mode.

Figure 4:
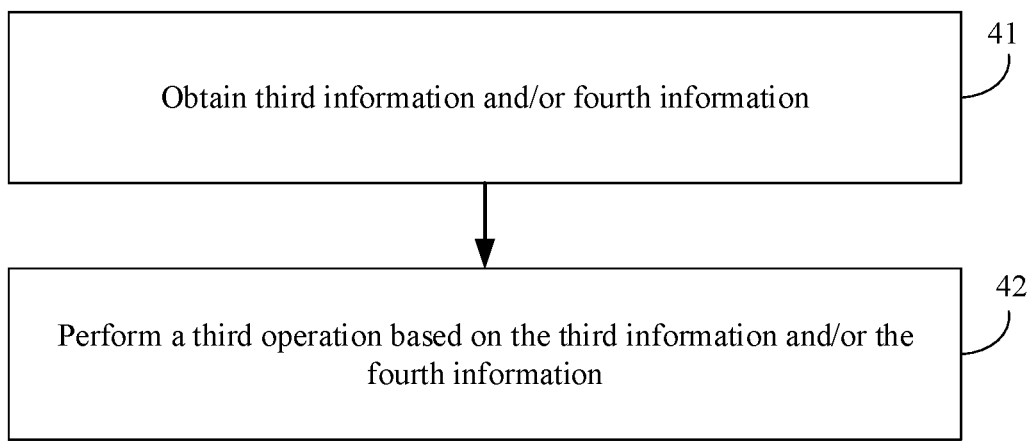
FIG. 4 is a schematic flowchart of an access control method according to still another embodiment of this application.

Referring to FIG. 4, an embodiment of this application provides an access control method, applied to a third communications device. The third communications device includes an NRF. Optionally, the third communications device is a communications device in a first network. As shown in FIG. 4, the method includes the following steps.

Step 41: Obtain third information and/or fourth information.

Optionally, the third information may include at least one of the following: a first-type group identifier, a first-type routing indication, a first-type network identifier, information about an authentication provider, and indication information of a first access mode.

Optionally, the fourth information is used to indicate home information of an authentication service network element. The fourth information may include at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential.

Optionally, the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

Optionally, the first network and the second network are a same network or different networks.

Optionally, the first-type routing indication includes: a routing indication used in the first access mode.

In an implementation, the restricted service includes a service for downloading a certificate for accessing the network.

Optionally, the first-type group identifier includes: a group identifier of the authentication service network element that provides an authentication service for a terminal being in the first access mode.

In an implementation, the third information may be obtained from an AMF.

In another implementation, the fourth information, that is, the home information of the authentication service network element, may be obtained from the authentication service network element (such as an AUSF or an AAA proxy).

Step 42: Perform a third operation based on the third information and/or the fourth information.

The third operation may include at least one of the following:

discovering an authentication service network element matching the third information, where fourth information of the authentication service network element matches the third information; and sending the discovered authentication service network element.

An authentication service type supported by the authentication service network element includes supporting provision of an authentication service to a terminal having a default credential.

In an implementation, the discovered authentication service network element is sent to a second target end. The second target end includes an AMF. In an implementation, the third information is received from the second target end.

Optionally, the authentication service network element may include one of the following: an AUSF and an AAA proxy.

In an implementation, the authentication service network element matching the third information is a first authentication service network element. The first authentication service network element includes an authentication service network element for providing an authentication service to a terminal being in the first access mode.

In an implementation, the first-type group identifier includes one of the following: an AUSF group ID and an AAA proxy group ID.

In an implementation, the NRF may be requested to discover an AUSF.

Optionally, in the operation of discovering an authentication service network element matching the third information, in a case that the third information includes the indication information of the first access mode, an access mode supported by the discovered authentication service network element is the first access mode; or in a case that the third information includes the first-type routing indication, a routing indication supported by the discovered authentication service network element is the first-type routing indication; or in a case that the third information includes the first-type network identifier, a network identifier of a network to which the discovered authentication service network element belongs is the first-type network identifier; or in a case that the third information includes the first-type group identifier, an identifier of a group to which the discovered authentication service network element belongs is the first-type group identifier; or in a case that the third information includes the information about the authentication provider, information about an authentication provider supported by the discovered authentication service network element includes the information about the authentication provider in the third information.

Alternatively, the discovered authentication service network element satisfies at least one of the following:

a routing indication supported by the discovered authentication service network element is the first-type routing indication;

a network identifier of a network to which the discovered authentication service network element belongs is the first-type network identifier;

an identifier of a group to which the discovered authentication service network element belongs is the first-type group identifier;

an access mode supported by the discovered authentication service network element is the first access mode; and an authentication service type supported by the discovered authentication service network element is supporting provision of an authentication service to a terminal having a default credential.

It is easy to understand that with the embodiments, selection of the authentication service network element can be supported in the foregoing scenario in which the terminal accesses the first network in the first access mode.

Figure 5:
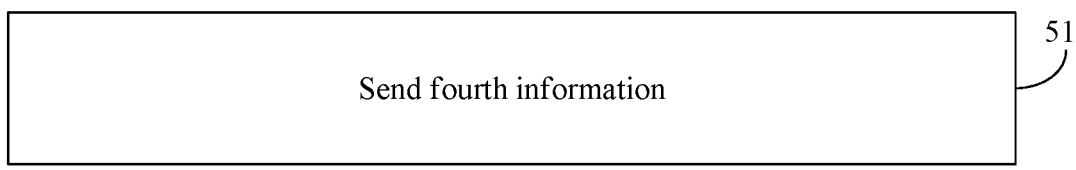
FIG. 5 is a schematic flowchart of an access control method according to yet another embodiment of this application.

Referring to FIG. 5, an embodiment of this application provides an access control method, applied to a fourth communications device. The fourth communications device includes an AUSF. Optionally, the fourth communications device is a communications device in a first network. As shown in FIG. 5, the method includes the following step.

Step 51: Send fourth information.

The fourth information is used to indicate home information of an authentication service network element. The fourth information may include at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential.

A routing indication supported by the authentication service network element is the first-type routing indication.

A network identifier of a network to which the authentication service network element belongs is the first-type network identifier.

An identifier of a group to which the authentication service network element belongs is the first-type group identifier.

An access mode supported by the authentication service network element includes the first access mode.

An authentication service type supported by the authentication service network element includes supporting provision of an authentication service (for example, acting as an authentication proxy) to a terminal having a default credential.

The first access mode includes at least one of the following: an access mode for accessing a first network to download a credential for accessing a second network, an access mode for accessing the first network without a credential for accessing the first network, and an access mode for using only a restricted service, where the credential for accessing the first network by the terminal is a default credential.

The first-type group identifier includes: a group identifier of the authentication service network element that provides an authentication service for a terminal being in the first access mode.

The first-type routing indication includes: a routing indication used in the first access mode.

The first-type network identifier includes: a network identifier used in the first access mode.

Optionally, the sending fourth information includes: sending the fourth information in a case that a second condition is satisfied; where the second condition includes that the authentication service network element is an authentication service network element for providing an authentication service to a terminal being in the first access mode.

It is easy to understand that with this embodiment, selection of the authentication service network element can be supported in the foregoing scenario in which the terminal accesses the first network in the first access mode.

An embodiment of this application provides an access control method, applied to a fifth communications device. The fifth communications device includes an AMF, an AUSF, and a UDM. Optionally, the fifth communications device is a communications device in a first network. The method includes:

performing a fifth operation in a case that a fifth condition is satisfied.

The fifth operation includes at least one of the following: skipping using fifth information to select a network element for a terminal; where the fifth condition includes at least one of the following: the terminal is in the first access mode; and the fifth information includes at least one of the following: a user identifier of the terminal, network identification information in the user identifier of the terminal, and information in realm in the user identifier of the terminal.

In an implementation, for a terminal that accesses the network in a non-first access mode, selecting a network device for the terminal based on the information in the user identifier of the terminal is a default operation. Therefore, an additional operation needs to be performed for the terminal that accesses the network in the non-first access mode.

The network identification information in the user identifier of the terminal includes at least one of the following: an MNC in the user identifier of the terminal, an MCC in the user identifier of the terminal, and a network identifier NID in the user identifier of the terminal.

Optionally, before the step of performing a fifth operation in a case that a fifth condition is satisfied, the method further includes: obtaining first information, where the first information includes at least one of the following: indication information of a first access mode, a first-type routing indication, and a first-type network identifier, and the second information includes at least one of the following: the first-type network identifier, the first-type routing indication, a first-type group identifier, and identification information of the terminal; where the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first-type group identifier includes: a group identifier of an authentication service network element that provides an authentication service for a terminal being in the first access mode;

the first-type network identifier includes: a network identifier used in the first access mode;

the first-type routing indication includes: a routing indication used in the first access mode;

the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

Optionally, after the step of obtaining first information, it is determined based on the first information that the fifth condition is satisfied.

Optionally, the network element includes at least one of the following: a core-network network element, an authentication service function AUSF, a unified data management UDM, and a unified data repository UDR.

In an implementation, the network element may be a network device.

The following describes the methods provided in the embodiments of this application with reference to specific application scenarios.

Application Scenario 1

Figure 6:
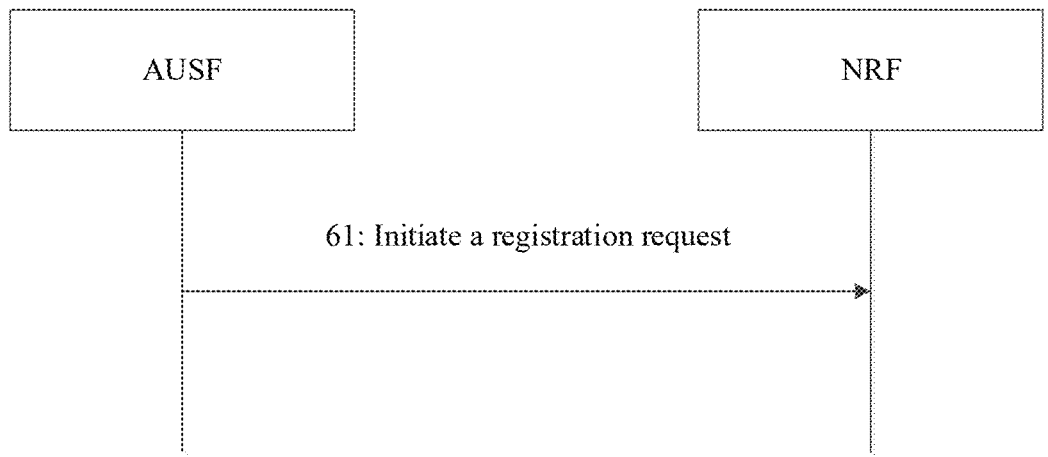
FIG. 6 is a flowchart of a service authentication indication process in an application scenario 1 according to an embodiment of this application.

In the application scenario 1, as shown in FIG. 6, an indication process of service authentication may include the following step.

Step 61: An authentication service network element for providing an authentication service to a terminal being in a first access mode (an AUSF is used as an instance for description below) initiates, to an NRF, a registration request, for example, Nnrf_NF Management_NF Register.

Optionally, the registration request includes fourth information, where the fourth information is used to indicate home information of the authentication service network element, and the fourth information may include at least one of the following: a network identifier of a network to which the authentication service network element belongs, an identifier of a group to which the discovered authentication service network element belongs, and an access mode supported by the authentication service network element.

In an implementation, in a case that the network identifier of the network to which the authentication service network element belongs is a first-type home network identifier, it may indicate that the authentication service network element is used to provide an authentication service for the terminal being in the first access mode.

In another implementation, in a case that the identifier of the group to which the authentication service network element belongs is a first-type group identifier, it may indicate that the authentication service network element is used to provide an authentication service for the terminal being in the first access mode.

Application Scenario 2

Figure 7:
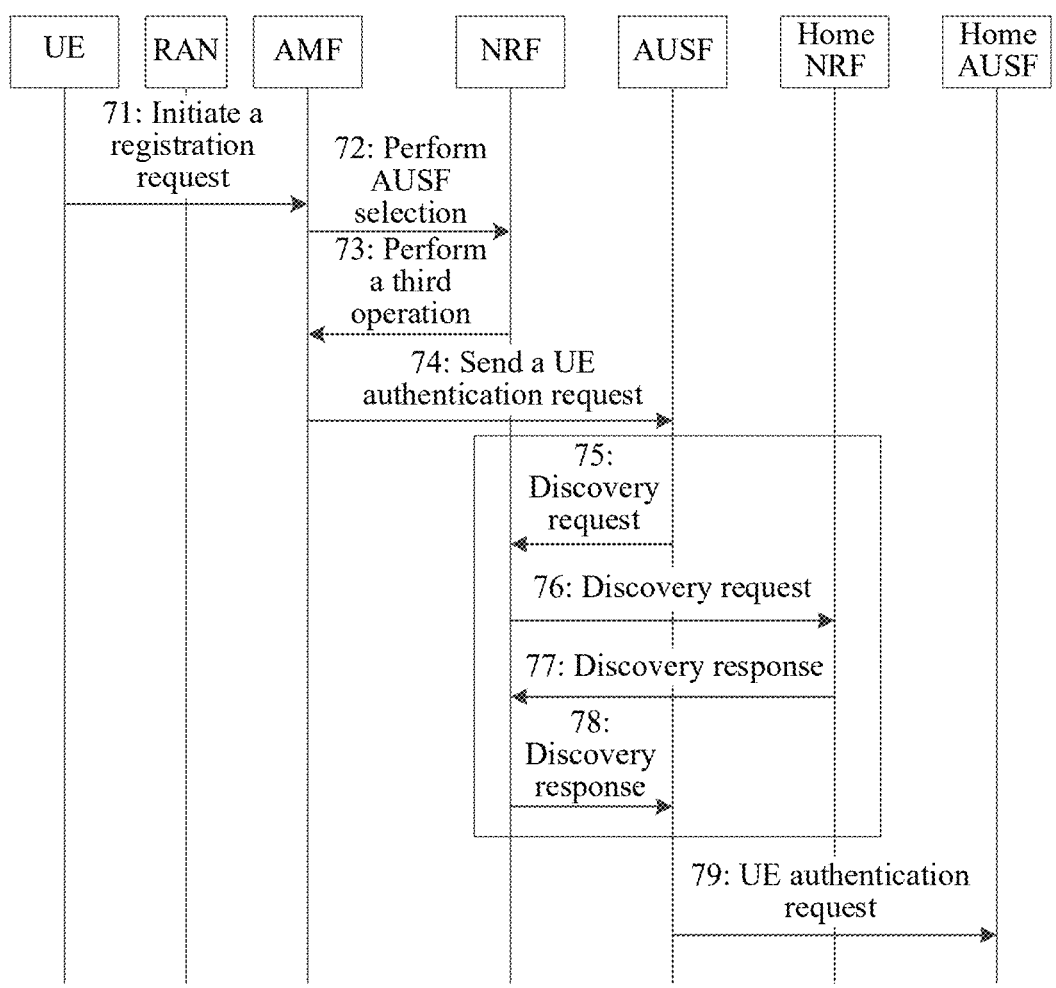
FIG. 7 is a flowchart of a service selection process in an application scenario 2 according to an embodiment of this application.

In the application scenario 2, UE registers with a first network, and a type of the registration is a first access mode. The first network needs to request a DCS to authenticate the UE. An AMF, an NRF, and an AUSF are communications devices in the first network, a home NRF and a home AUSF are devices in a home network of the UE, and the home AUSF is an embodiment of the DCS. As shown in FIG. 7, the process of selecting an AUSF may include the following steps.

Step 71: The UE initiates a registration request to the AMF, where a registration type of the registration request is indication information of the first access mode (for example, a first registration type).

Step 72: Based on the indication information of the first access mode (for example, the first registration type) provided by the UE, the AMF performs an AUSF selection operation, including at least one of the following.

(1) Select an AUSF locally configured for the first access mode.

(2) Select an AUSF group identifier (AUSF Group ID) locally configured for the first access mode, and request the NRF based on the AUSF group identifier to discover an AUSF.

(3) Send the indication information of the first access mode to the NRF by using a network function discovery request, for example, Nnrf_NF Discovery_Request, so as to request to discover an AUSF that supports the first access mode.

It is easy to understand that before this, during registration with the NRF, the AUSF needs to provide an access mode supported by the AUSF, for example, the first access mode.

(4) Send a first-type network identifier (Home Network ID) to the NRF by using a network function discovery request, for example, Nnrf_NF Discovery_Request.

It is easy to understand that before this, during registration with the NRF, the AUSF supporting the first access mode needs to provide a network identifier of a network to which the authentication service network element belongs, where the network identifier is a network identifier for the first access mode, for example, a network identifier specially used for the first access mode.

(5) Send a first-type group identifier to the NRF by using a network function discovery request, for example, Nnrf_NF Discovery_Request.

It is easy to understand that before this, during registration with the NRF, the AUSF supporting the first access mode needs to provide an identifier of a group to which the authentication service network element belongs, where the identifier is a group identifier for the first access mode, for example, a group identifier of the authentication service network element specially used for the first access mode.

Step 73: The NRF performs a third operation based on third information and/or fourth information that is obtained.

The third information may include at least one of the following: a first-type group identifier, a first-type network identifier, and indication information of the first access mode. The fourth information is used to indicate home information of an authentication service network element. The fourth information may include at least one of the following: a network identifier of a network to which the authentication service network element belongs, an identifier of a group to which the authentication service network element belongs, and an access mode supported by the authentication service network element.

The third operation includes at least one of the following:
discovering an authentication service network element matching the third information (using an AUSF as an example for description below); and
sending the discovered authentication service network element to the AMF.

Step 74: The AMF sends, to the AUSF, a UE authentication request, for example, Nausf_UEAuthentication_Authenticate Request, where the request may include a first identifier of the terminal (a real first SUCI or first SUPI of the UE).

Step 75 to step 78: The AUSF discovers a home AUSF by using the NRF and a home NRF based on the first identifier of the terminal, a home network identifier in a first UE identifier, or an AUSF group identifier corresponding to the first UE identifier.

Specifically, in step 75, the AUSF sends to the NRF a network function discovery request, for example, Nnrf_NF Discovery_Request. The discovery request may include one of the following: the first identifier of the terminal, a home network identifier Home Network ID of the terminal, an AUSF group identifier related to the first identifier of the terminal, and the like.

In step 76, the NRF sends to the home NRF a network function discovery request, for example, Nnrf_NF Discovery_Request. The discovery request may include the first identifier of the terminal, the home network identifier in the first UE identifier, the AUSF group identifier corresponding to the first UE identifier, or the like.

In step 77, the home NRF sends to the NRF a network function discovery response, for example, Nnrf_NF Discovery_Response.

In step 78, the NRF returns to the AUSF a network function discovery response, for example, Nnrf_NF Discovery_Response.

Step 79: The AUSF initiates, to the home AUSF, a UE authentication request, for example, Nausf_UE Authentication_Authenticate Request. The request includes a second SUCI or first SUPI that is generated, an SN-name, the indication information of the first access mode, and the like.

Then, the home AUSF may initiate an authentication procedure to the UE.

Application Scenario 3

Figure 8:
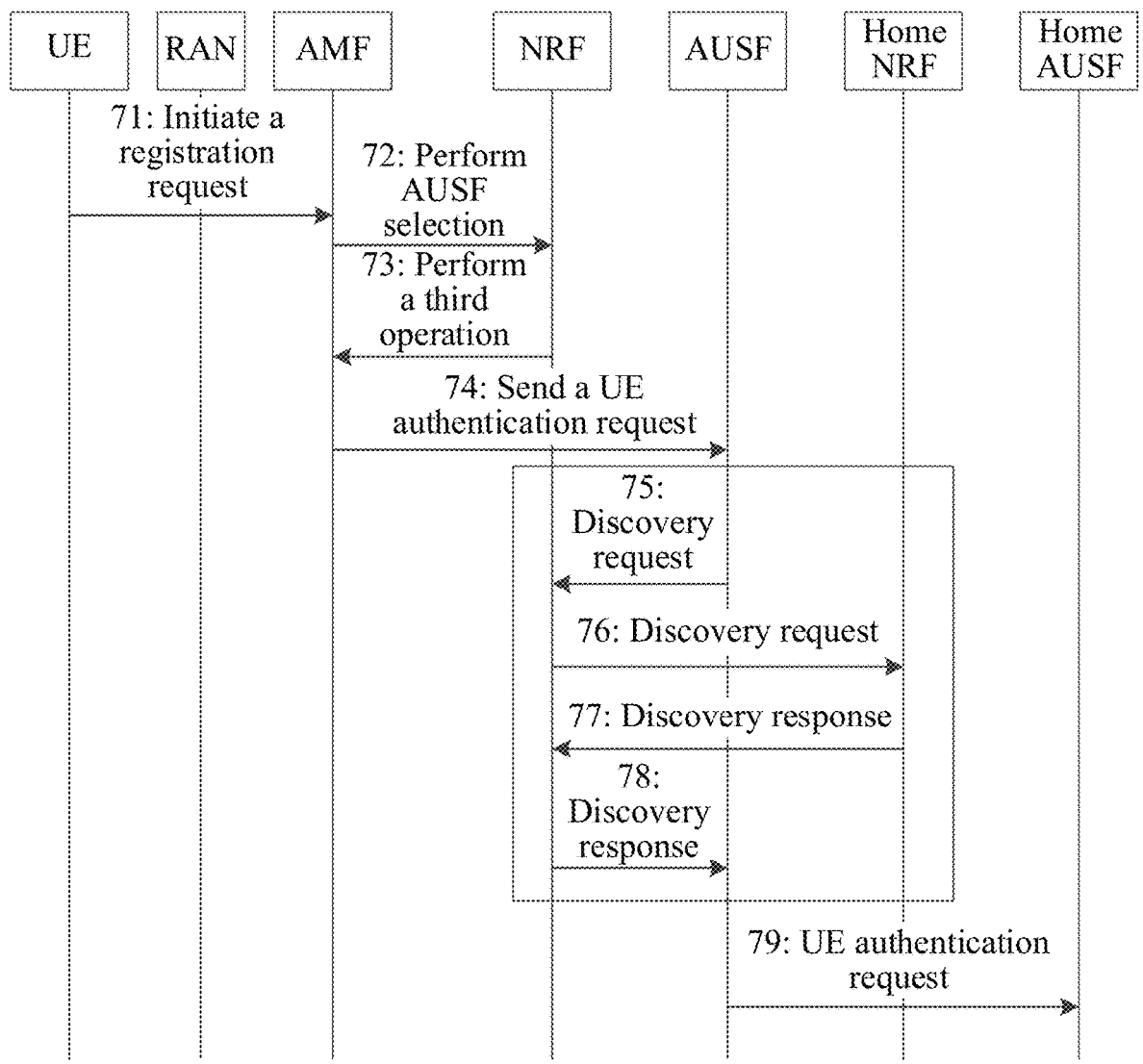
FIG. 8 is a flowchart of a service selection process in an application scenario 3 according to an embodiment of this application.

In the application scenario 3, UE registers with a first network and provides identification information of the terminal. The first network needs to request a DCS to authenticate the UE. An AMF, an NRF, and an AUSF are communications devices in the first network, a home NRF and a home AUSF are devices in a home network of the UE, and the home AUSF is an embodiment of the DCS. As shown in FIG. 8, the process of selecting an AUSF may include the following steps.

Step 81: The UE initiates a registration request to the AMF. Optionally, the registration request includes first information, for example, the identification information of the terminal.

The identification information of the terminal may include at least one of the following: a first identifier of the terminal, a second identifier of the terminal, and a third identifier of the terminal.

The first identifier of the terminal includes information about an authentication provider of the terminal;
the second identifier of the terminal includes a first-type network identifier and/or a first-type routing indication; and the third identifier of the terminal includes the information about the authentication provider of the terminal, the first-type network identifier, and/or the first-type routing indication.

The AMF may perform: exporting the first-type network identifier and/or the first-type routing indication based on the second identifier of the terminal or the third identifier of the terminal.

The first-type network identifier includes: a specific value specially used for the first access mode, for example, 111.

The first-type routing indication includes: a specific value specially used for the first access mode.

(1) In an implementation, the registration request includes the first identifier of the terminal and the first-type network identifier.

(2) In another implementation, the registration request includes the first identifier of the terminal and the second identifier of the terminal.

(3) In another implementation, the registration request includes the third identifier of the terminal.

When the first identifier (SUPI or SUPI) of the terminal indicates subscription to a PLMN or an SNPN, index information of the DCS includes a real home network ID in the SUPI of the UE.

Step 82: The AMF sends to the NRF a network function discovery request, for example, Nnrf_NF Discovery_Request, that is, requests the NRF based on a home network identifier for the first access mode to query an AUSF, so as to obtain the AUSF.

Optionally, the request includes a home network ID and/or group ID of the AUSF.

Step 83: The NRF returns, to the AMF, a discovered authentication service network element, that is, the AUSF.

Step 84: The AMF sends, to the AUSF, a UE authentication request, for example, Nausf_UEAuthentication_Authenticate Request.

Optionally, the AMF may perform at least one of the following:
  skipping sending the second identifier of the terminal to a first authentication service network element or the discovered authentication service network element;
  exporting the first identifier of the terminal based on the third identifier of the terminal; and
  sending the first identifier of the terminal to the first authentication service network element or the discovered authentication service network element.

Step 85 to step 89 are the same as steps 75 to 79 in the application scenario 2, which are not repeated herein.

Figure 9:
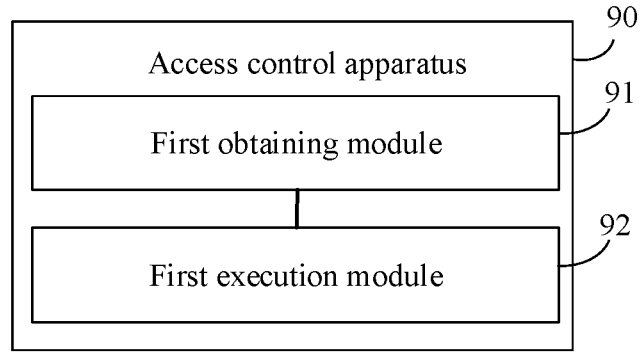
FIG. 9 is a structural diagram of an access control apparatus according to an embodiment of this application.

Referring to FIG. 9, an embodiment of this application provides an access control apparatus, applied to a first communications device. As shown in FIG. 9, the access control apparatus 90 includes:
  a first obtaining module 91, configured to obtain first information and/or second information, where the first information includes at least one of the following: indication information of a first access mode, a first-type routing indication, and a first-type network identifier, and the second information includes at least one of the following: the first-type network identifier, the first-type routing indication, a first-type group identifier, and identification information of a terminal; and
  a first execution module 92, configured to perform a first operation based on the first information and/or the second information.

The first operation includes at least one of the following:
  selecting a first authentication service network element;
  determining the first-type group identifier, the first-type routing indication, information about a service provider, and/or the first-type network identifier; and
  requesting, based on the first-type group identifier, the first-type routing indication, the first-type network identifier, the information about the service provider, and/or the indication information of the first access mode, to discover an authentication service network element.

The indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;
  the first network and the second network are a same network or different networks;
  the first authentication service network element includes at least one of the following: an authentication service network element that provides an authentication service for a terminal being in the first access mode, and an authentication service network element that provides an authentication service for a terminal having a default credential;
  the first-type group identifier includes: a group identifier of the authentication service network element that provides an authentication service for a terminal being in the first access mode;
  the first-type network identifier includes: a network identifier used in the first access mode;
  the first-type routing indication includes: a routing indication used in the first access mode;
  the identification information of the terminal includes at least one of the following: a first identifier of the terminal, a second identifier of the terminal, and a third identifier of the terminal;
  the first identifier of the terminal includes information about an authentication provider of the terminal;
  the second identifier of the terminal includes the first-type network identifier and/or the first-type routing indication; and
  the third identifier of the terminal includes the information about the authentication provider of the terminal, the first-type network identifier, and/or the first-type routing indication.

Optionally, the first execution module 92 is further configured to perform at least one of the following:
  sending the first-type group identifier to a first target end, where the first-type group identifier is used by the first target end to discover an authentication service network element matching the first-type group identifier;
  sending the indication information of the first access mode to the first target end, where the indication information of the first access mode is used by the first target end to discover an authentication service network element matching the indication information of the first access mode;
  sending the first-type routing indication to the first target end, where the first-type routing indication is used by the first target end to discover an authentication service network element matching the first-type routing indication; and sending the first-type network identifier to the first target end, where the first-type network identifier is used by the first target end to discover an authentication service network element matching the first-type network identifier.

Optionally, the first obtaining module 91 is specifically configured to: obtain the first information from the terminal.

Optionally, the first obtaining module 91 is specifically configured to: obtain the second information according to a configuration on the first communications device.

Optionally, the first obtaining module 91 is specifically configured to perform at least one of the following:

obtaining the indication information of the first access mode from the terminal; and obtaining the first-type group identifier, the first-type routing indication, or the first-type network identifier according to a configuration on the first communications device.

The performing a first operation based on the first information and/or the second information includes at least one of the following:

determining the first-type group identifier, the first-type routing indication, or the first-type network identifier based on the indication information of the first access mode; and requesting, based on the first-type group identifier, the first-type routing indication, and/or the first-type network identifier, to discover the authentication service network element.

Optionally, the first obtaining module 91 is specifically configured to perform at least one of the following:

obtaining the first-type network identifier and/or the first-type routing indication from the terminal; and obtaining the first-type group identifier according to a configuration on the first communications device.

The performing a first operation based on the first information and/or the second information includes at least one of the following:

determining the first-type group identifier based on the first-type network identifier and/or the first-type routing indication; and requesting, based on the first-type group identifier, to discover the authentication service network element.

Optionally, the first operation further includes at least one of the following:

receiving an authentication service network element that is discovered as requested;

exporting the first-type network identifier and/or the first-type routing indication based on the second identifier of the terminal or the third identifier of the terminal;

skipping sending the second identifier of the terminal to the first authentication service network element or the discovered authentication service network element;

exporting the first identifier of the terminal based on the third identifier of the terminal; and sending the first identifier of the terminal to the first authentication service network element or the discovered authentication service network element.

In this embodiment, the access control apparatus 90 is capable of implementing the processes implemented in the method embodiment shown in FIG. 2 of this application, with the same beneficial effects achieved. To avoid repetition, details are not described herein again.

Figure 10:
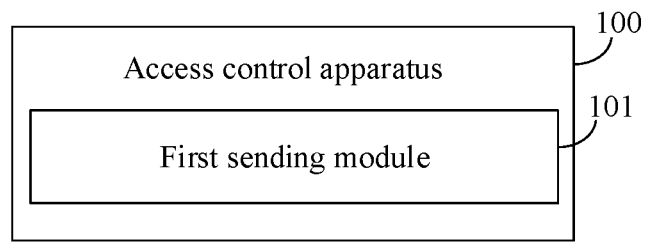
FIG. 10 is a structural diagram of another access control apparatus according to an embodiment of this application.

Referring to FIG. 10, an embodiment of this application provides an access control apparatus, applied to a second communications device. As shown in FIG. 10, the access control apparatus 100 includes:

a first sending module 101, configured to send first information.

The first information includes at least one of the following: indication information of a first access mode, a first-type routing indication, a first-type network identifier, and identification information of a terminal;

the first-type routing indication includes: a routing indication used in the first access mode;

the first-type network identifier includes: a network identifier used in the first access mode;

the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

Optionally, the first sending module 101 is specifically configured to: send the first information in a case that a first condition is satisfied.

The first condition includes at least one of the following:

a purpose of accessing the first network by the second communications device is to download a credential for accessing the second network;

the second communications device has no credential for accessing the first network; and the second communications device accessing the first network is merely allowed to use a restricted service.

Optionally, the access control apparatus 100 further includes:

a generating module, configured to generate the second identifier of the terminal, and set a routing indication in an identifier of the terminal to the first-type routing indication and/or set a home network identifier in the identifier of the terminal to the first-type network identifier; and/or generate a third identifier of the terminal, and add the first-type network identifier to the identifier of the terminal and/or adding the first-type routing indication to the identifier of the terminal.

In this embodiment, the access control apparatus 100 is capable of implementing the processes implemented in the method embodiment shown in FIG. 3 of this application, with the same beneficial effects achieved. To avoid repetition, details are not described herein again.

Figure 11:
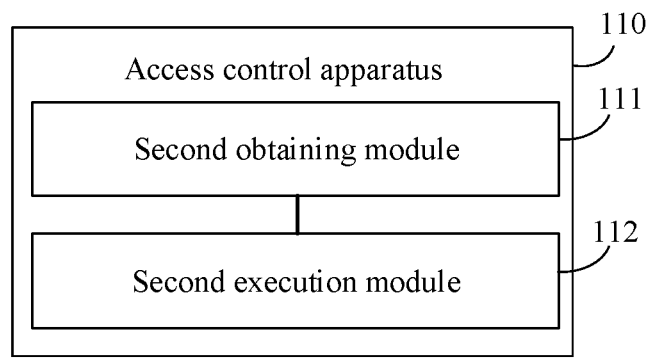
FIG. 11 is a structural diagram of another access control apparatus according to an embodiment of this application.

Referring to FIG. 11, an embodiment of this application provides an access control apparatus, applied to a third communications device. As shown in FIG. 11, the access control apparatus 110 includes:

a second obtaining module 111, configured to obtain third information and/or fourth information, where the third information includes at least one of the following: a first-type group identifier, a first-type routing indication, a first-type network identifier, information about an authentication provider, and indication information of a first access mode; and the fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; and a second execution module 112, configured to perform a third operation based on the third information and/or the fourth information.

The third operation includes at least one of the following:

discovering an authentication service network element matching the third information, where fourth information of the authentication service network element matches the third information; and sending the discovered authentication service network element.

An authentication service type supported by the authentication service network element includes supporting provision of an authentication service to a terminal having a default credential;

the indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first network and the second network are a same network or different networks;

the first-type group identifier includes: a group identifier of the authentication service network element that provides an authentication service for a terminal being in the first access mode;

the first-type routing indication includes: a routing indication used in the first access mode; and the first-type network identifier includes: a network identifier used in the first access mode.

Optionally, in the operation of discovering an authentication service network element matching the third information, in a case that the third information includes the indication information of the first access mode, an access mode supported by the discovered authentication service network element is the first access mode; or in a case that the third information includes the first-type routing indication, a routing indication supported by the discovered authentication service network element is the first-type routing indication; or in a case that the third information includes the first-type network identifier, a network identifier of a network to which the discovered authentication service network element belongs is the first-type network identifier; or in a case that the third information includes the first-type group identifier, an identifier of a group to which the discovered authentication service network element belongs is the first-type group identifier; or in a case that the third information includes the information about the authentication provider, information about an authentication provider supported by the discovered authentication service network element includes the information about the authentication provider in the third information; or the discovered authentication service network element satisfies at least one of the following:

a routing indication supported by the discovered authentication service network element is the first-type routing indication;

a network identifier of a network to which the discovered authentication service network element belongs is the first-type network identifier;

an identifier of a group to which the discovered authentication service network element belongs is the first-type group identifier;

an access mode supported by the discovered authentication service network element is the first access mode; and an authentication service type supported by the discovered authentication service network element is supporting provision of an authentication service to a terminal having a default credential.

In this embodiment, the access control apparatus 110 is capable of implementing the processes implemented in the method embodiment shown in FIG. 4 of this application, with the same beneficial effects achieved. To avoid repetition, details are not described herein again.

Figure 12:
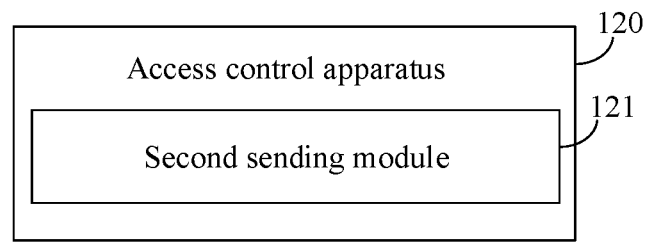
FIG. 12 is a structural diagram of another access control apparatus according to an embodiment of this application.

Referring to FIG. 12, an embodiment of this application provides an access control apparatus, applied to a fourth communications device. As shown in FIG. 12, the access control apparatus 120 includes:

a second sending module 121, configured to send fourth information.

The fourth information is used to indicate home information of an authentication service network element, and the fourth information includes at least one of the following: a routing indication supported by the authentication service network element, a network identifier of a network to which the authentication service network element belongs, an identifier of a group to which the authentication service network element belongs, an access mode supported by the authentication service network element, an authentication service type supported by the authentication service network element, and information about an authentication provider supported by the authentication service network element, the authentication provider being capable of authenticating a terminal having a default credential; where a routing indication supported by the authentication service network element is the first-type routing indication;

a network identifier of a network to which the authentication service network element belongs is the first-type network identifier;

an identifier of a group to which the authentication service network element belongs is the first-type group identifier;

an access mode supported by the authentication service network element includes the first access mode;

an authentication service type supported by the authentication service network element includes supporting provision of an authentication service to a terminal having a default credential;

the first access mode includes at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first-type group identifier includes: a group identifier of the authentication service network element that provides an authentication service for a terminal being in the first access mode; and the first-type network identifier includes: a network identifier used in the first access mode.

Optionally, the second sending module 121 is further configured to: send the fourth information in a case that a second condition is satisfied.

The second condition includes that the authentication service network element is an authentication service network element for providing an authentication service to a terminal being in the first access mode.

In this embodiment, the access control apparatus 120 is capable of implementing the processes implemented in the method embodiment shown in FIG. 5 of this application, with the same beneficial effects achieved. To avoid repetition, details are not described herein again.

This application further provides an access control apparatus, applied to a fifth communications device and including:

a third execution module, configured to perform a fifth operation in a case that a fifth condition is satisfied.

The fifth operation includes at least one of the following: skipping using fifth information to select a network element for a terminal; where the fifth condition includes at least one of the following: the terminal is in the first access mode; and the fifth information includes at least one of the following: a user identifier of the terminal, network identification information in the user identifier of the terminal, and information in realm in the user identifier of the terminal.

In an implementation, for a terminal that accesses the network in a non-first access mode, selecting a network device for the terminal based on the information in the user identifier of the terminal is a default operation. Therefore, an additional operation needs to be performed for the terminal that accesses the network in the non-first access mode.

The network identification information in the user identifier of the terminal includes at least one of the following: an MNC in the user identifier of the terminal, an MCC in the user identifier of the terminal, and a network identifier NID in the user identifier of the terminal.

Optionally, the apparatus further includes:

a third obtaining module, configured to obtain first information, where the first information includes at least one of the following: indication information of a first access mode, a first-type routing indication, and a first-type network identifier, and the second information includes at least one of the following: the first-type network identifier, the first-type routing indication, a first-type group identifier, and identification information of the terminal.

The indication information of the first access mode is used to indicate at least one of the following: an access mode for accessing a first network to download a credential for accessing a second network, an access mode for accessing the first network without a credential for accessing the first network, and an access mode for using only a restricted service, where the credential for accessing the first network by the terminal is a default credential;

the first-type group identifier includes: a group identifier of an authentication service network element that provides an authentication service for a terminal being in the first access mode;

the first-type network identifier includes: a network identifier used in the first access mode;

the first-type routing indication includes: a routing indication used in the first access mode;

the identification information of the terminal includes at least one of the following: a first identifier of the terminal, a second identifier of the terminal, and a third identifier of the terminal;

the first identifier of the terminal includes information about an authentication provider of the terminal;

the second identifier of the terminal includes the first-type network identifier and/or the first-type routing indication; and the third identifier of the terminal includes the information about the authentication provider of the terminal, the first-type network identifier, and/or the first-type routing indication.

Optionally, the apparatus further includes:

a determining module, configured to determine based on the first information that the fifth condition is satisfied.

Optionally, the network element includes at least one of the following: a core-network network element, an AUSF, a UDM, and a UDR.

In an implementation, the network element may be a network device.

Figure 13:
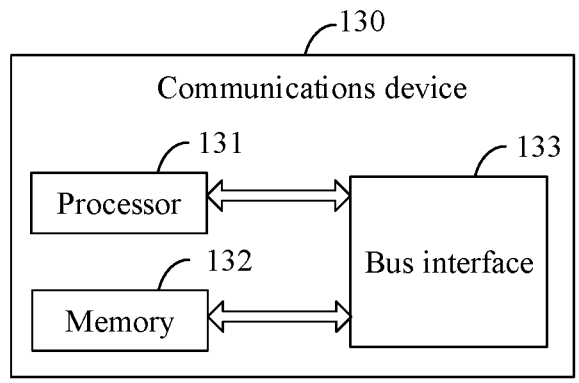
FIG. 13 is a structural diagram of a communications device according to an embodiment of this application.

Referring to FIG. 13, FIG. 13 is a schematic structural diagram of another communications device according to an embodiment of this application. As shown in FIG. 13, the communications device 130 includes a processor 131, a memory 132, and a computer program stored on the memory 132 and capable of running on the processor. The components of the communications device 130 are coupled together by using the bus interface 133. When the computer program is executed by the processor 131, the processes implemented in the method embodiment shown in FIG. 2 can be implemented, the processes implemented in the method embodiment shown in FIG. 3 can be implemented, the processes implemented in the method embodiment shown in FIG. 4 can be implemented, or the processes implemented in the method embodiment shown in FIG. 5 can be implemented, with the same technical effects achieved. To avoid repetition, details are not described herein again.

An embodiment of this application further provides a computer-readable storage medium, where a computer program is stored in the computer-readable storage medium, and when the computer program is executed by a processor, the processes implemented in the method embodiment shown in FIG. 2 are implemented, or the processes implemented in the method embodiment shown in FIG. 3 are implemented, or the processes implemented in the method embodiment shown in FIG. 4 are implemented, or the processes implemented in the method embodiment shown in FIG. 5 are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An access control method, performed by a first communications device and comprising:
obtaining first information from a terminal, wherein the first information comprises identification information of the terminal, wherein the identification information of the terminal comprises index information of a default credential server (DCS); and
performing a first operation based on the first information; wherein
the first operation comprises:
sending third information to a third communication device; wherein the third information comprises the index information of the DCS;
receiving a discovered authentication service network element from the third communication device, the index information of the DCS supported by the discovered authentication service network element comprises the index information of the DCS in the third information.

2. The method according to claim 1, the first information further comprises at least one of the following: indication information of a first access mode, a first-type routing indication, or a first-type network identifier; or the method further comprises:
obtaining second information, the second information comprises at least one of the following: the first-type network identifier, the first-type routing indication, or a first-type group identifier;
wherein the first operation further comprises at least one of the following:
selecting a first authentication service network element;
determining the first-type group identifier, the first-type routing indication, information about a service provider, and/or the first-type network identifier; or
requesting, based on the first-type group identifier, the first-type routing indication, the first-type network identifier, the information about the service provider, and/or the indication information of the first access mode, to discover an authentication service network element; wherein
the indication information of the first access mode is used to indicate at least one of the following: an access mode for accessing a first network to download a credential for accessing a second network, an access mode for accessing the first network without a credential for accessing the first network, an access mode for using only a restricted service, or the credential for accessing the first network by the terminal is a default credential;
wherein the first network and the second network are a same network or different networks;
wherein the first authentication service network element comprises at least one of the following: an authentication service network element that provides an authentication service for a terminal being in the first access mode, or an authentication service network element that provides an authentication service for a terminal having a default credential;
the first-type group identifier comprises: a group identifier of the authentication service network element that provides an authentication service for a terminal being in the first access mode;
the first-type network identifier comprises: a network identifier used in the first access mode;
the first-type routing indication comprises: a routing indication used in the first access mode.

3. The method according to claim 2, wherein the requesting, based on the first-type group identifier, the first-type routing indication, the first-type network identifier, and/or the indication information of the first access mode, to discover an authentication service network element comprises at least one of the following:
sending the first-type group identifier to a first target end, wherein the first-type group identifier is used by the first target end to discover an authentication service network element matching the first-type group identifier;
sending the indication information of the first access mode to the first target end, wherein the indication information of the first access mode is used by the first target end to discover an authentication service network element matching the indication information of the first access mode;
sending the first-type routing indication to the first target end, wherein the first-type routing indication is used by the first target end to discover an authentication service network element matching the first-type routing indication; or
sending the first-type network identifier to the first target end, wherein the first-type network identifier is used by the first target end to discover an authentication service network element matching the first-type network identifier.

4. The method according to claim 1, the method further comprises:
obtaining the indication information of the first access mode from the terminal; and
obtaining the first-type group identifier, the first-type routing indication, or the first-type network identifier according to a configuration on the first communications device;
the first operation further comprises at least one of the following:
determining the first-type group identifier, the first-type routing indication, or the first-type network identifier based on the indication information of the first access mode; or
requesting, based on the first-type group identifier, the first-type routing indication, and/or the first-type network identifier, to discover the authentication service network element.

5. The method according to claim 1, the method further comprises:
obtaining the first-type network identifier and/or the first-type routing indication from the terminal; and
obtaining the first-type group identifier according to a configuration on the first communications device; wherein
the first operation further comprises at least one of the following:
determining the first-type group identifier based on the first-type network identifier and/or the first-type routing indication; or
requesting, based on the first-type group identifier, to discover the authentication service network element.

6. The method according to claim 1, wherein the first operation further comprises at least one of the following:
receiving an authentication service network element that is discovered as requested;
exporting the first-type network identifier and/or the first-type routing indication based on a second identifier of the terminal or a third identifier of the terminal;
skipping sending the second identifier of the terminal to the first authentication service network element or the discovered authentication service network element;
exporting a first identifier of the terminal based on the third identifier of the terminal; or
sending the first identifier of the terminal to the first authentication service network element or the discovered authentication service network element;
wherein the first identifier comprises the index information of the DCS;
the second identifier comprises the first-type network identifier and/or the first-type routing indication;
the third identifier comprises the index information of the DCS of the terminal, the first-type network identifier and/or the first-type routing indication.

7. The method according to claim 1, wherein the first communications device comprises access and mobility management function (AMF).

8. The method according to claim 1, the index information of the DCS is included in a subscription concealed identifier (SUCI) or a subscription permanent identifier (SUPI) of the terminal for transmission.

9. An access control method, performed by a third communications device and comprising:
obtaining third information from a first communications device, the third information comprises index information of a default credential server (DCS);
obtaining fourth information from an authentication service network element, the fourth information comprises the index information of the DCS supported by the authentication service network element, the DCS being capable of authenticating a terminal having a default credential;
performing a third operation based on the third information and the fourth information; wherein
the third operation comprises at least one of the following:
discovering an authentication service network element matching the third information; or
sending the discovered authentication service network element to the first communications device; wherein
the index information of the DCS supported by the discovered authentication service network element comprises the index information of the DCS in the third information.

10. The method according to claim 9, wherein the third information further comprises at least one of the following: a first-type group identifier, a first-type routing indication, a first-type network identifier, or indication information of a first access mode;
the fourth information comprises at least one of the following: a routing indication supported by the authentication service network element, a network identifier of a network to which the authentication service network element belongs, an identifier of a group to which the authentication service network element belongs, an access mode supported by the authentication service network element, or an authentication service type supported by the authentication service network element; wherein
an authentication service type supported by the authentication service network element comprises supporting provision of an authentication service to a terminal having a default credential;
the indication information of the first access mode is used to indicate at least one of the following: an access mode for accessing a first network to download a credential for accessing a second network, an access mode for accessing the first network without a credential for accessing the first network, an access mode for using only a restricted service, or the credential for accessing the first network by the terminal is a default credential;
the first network and the second network are a same network or different networks;
the first-type group identifier comprises: a group identifier of the authentication service network element that provides an authentication service for a terminal being in the first access mode;
the first-type routing indication comprises: a routing indication used in the first access mode; and
the first-type network identifier comprises: a network identifier used in the first access mode.

11. The method according to claim 10, wherein in the operation of discovering an authentication service network element matching the third information,
in a case that the third information comprises the indication information of the first access mode, an access mode supported by the discovered authentication service network element is the first access mode; or
in a case that the third information comprises the first-type routing indication, a routing indication supported by the discovered authentication service network element is the first-type routing indication; or in a case that the third information comprises the first-type network identifier, a network identifier of a network to which the discovered authentication service network element belongs is the first-type network identifier; or in a case that the third information comprises the first-type group identifier, an identifier of a group to which the discovered authentication service network element belongs is the first-type group identifier; or the discovered authentication service network element satisfies at least one of the following:

a routing indication supported by the discovered authentication service network element is the first-type routing indication;

a network identifier of a network to which the discovered authentication service network element belongs is the first-type network identifier;

an identifier of a group to which the discovered authentication service network element belongs is the first-type group identifier;

an access mode supported by the discovered authentication service network element is the first access mode; or an authentication service type supported by the discovered authentication service network element is supporting provision of an authentication service to a terminal having a default credential.

12. The method according to claim 9, the third communications device comprises a network repository function (NRF).

13. A communications device, comprising a processor, a memory, and a computer program stored in the memory and capable of running on the processor, wherein when the computer program is executed by the processor, the following steps are implemented:

obtaining first information from a terminal, wherein the first information comprises identification information of the terminal, wherein the identification information of the terminal comprises index information of a default credential server (DCS); and performing a first operation based on the first information; wherein the first operation comprises:

sending third information to a third communication device; wherein the third information comprises the index information of the DCS;

receiving a discovered authentication service network element from the third communication device, the index information of the DCS supported by the discovered authentication service network element comprises the index information of the DCS in the third information.

14. The communications device according to claim 13, the first information further comprises at least one of the following: indication information of a first access mode, a first-type routing indication, or a first-type network identifier; or wherein when the computer program is executed by the processor, further causes the communications device to:

obtaining second information, the second information comprises at least one of the following: the first-type network identifier, the first-type routing indication, or a first-type group identifier;

wherein the first operation further comprises at least one of the following:

selecting a first authentication service network element;

determining the first-type group identifier, the first-type routing indication, information about a service provider, and/or the first-type network identifier; or requesting, based on the first-type group identifier, the first-type routing indication, the first-type network identifier, the information about the service provider, and/or the indication information of the first access mode, to discover an authentication service network element; wherein the indication information of the first access mode is used to indicate at least one of the following: an access mode for accessing a first network to download a credential for accessing a second network, an access mode for accessing the first network without a credential for accessing the first network, an access mode for using only a restricted service, or the credential for accessing the first network by the terminal is a default credential;

wherein the first network and the second network are a same network or different networks;

wherein the first authentication service network element comprises at least one of the following: an authentication service network element that provides an authentication service for a terminal being in the first access mode, or an authentication service network element that provides an authentication service for a terminal having a default credential;

the first-type group identifier comprises: a group identifier of the authentication service network element that provides an authentication service for a terminal being in the first access mode;

the first-type network identifier comprises: a network identifier used in the first access mode;

the first-type routing indication comprises: a routing indication used in the first access mode.

15. The communications device according to claim 14, wherein the requesting, based on the first-type group identifier, the first-type routing indication, the first-type network identifier, and/or the indication information of the first access mode, to discover an authentication service network element comprises at least one of the following:

sending the first-type group identifier to a first target end, wherein the first-type group identifier is used by the first target end to discover an authentication service network element matching the first-type group identifier;

sending the indication information of the first access mode to the first target end, wherein the indication information of the first access mode is used by the first target end to discover an authentication service network element matching the indication information of the first access mode;

sending the first-type routing indication to the first target end, wherein the first-type routing indication is used by the first target end to discover an authentication service network element matching the first-type routing indication; or sending the first-type network identifier to the first target end, wherein the first-type network identifier is used by the first target end to discover an authentication service network element matching the first-type network identifier.

16. The communications device according to claim 13, wherein when the computer program is executed by the processor, further causes the communications device to:

obtaining the indication information of the first access mode from the terminal; and obtaining the first-type group identifier, the first-type routing indication, or the first-type network identifier according to a configuration on the first communications device;

the first operation further comprises at least one of the following:

determining the first-type group identifier, the first-type routing indication, or the first-type network identifier based on the indication information of the first access mode; or requesting, based on the first-type group identifier, the first-type routing indication, and/or the first-type network identifier, to discover the authentication service network element.

17. The communications device according to claim 13, wherein when the computer program is executed by the processor, further causes the communications device to:

obtaining the first-type network identifier and/or the first-type routing indication from the terminal; and obtaining the first-type group identifier according to a configuration on the first communications device; wherein the first operation further comprises at least one of the following:

determining the first-type group identifier based on the first-type network identifier and/or the first-type routing indication; or requesting, based on the first-type group identifier, to discover the authentication service network element.

18. The communications device according to claim 13, wherein the first operation further comprises at least one of the following:

receiving an authentication service network element that is discovered as requested;

exporting the first-type network identifier and/or the first-type routing indication based on a second identifier of the terminal or a third identifier of the terminal;

skipping sending the second identifier of the terminal to the first authentication service network element or the discovered authentication service network element;

exporting a first identifier of the terminal based on the third identifier of the terminal; or sending the first identifier of the terminal to the first authentication service network element or the discovered authentication service network element;

wherein the first identifier comprises the index information of the DCS;

the second identifier comprises the first-type network identifier and/or the first-type routing indication;

the third identifier comprises the index information of the DCS of the terminal, the first-type network identifier and/or the first-type routing indication.

19. The communications device according to claim 13, wherein the first communications device comprises access and mobility management function (AMF).

20. The communications device according to claim 13, the index information of the DCS is included in a subscription concealed identifier (SUCI) or a subscription permanent identifier (SUPI) of the terminal for transmission.

* * * * *